United States Patent [19]

Shiota

[11] 4,381,680
[45] May 3, 1983

[54] MASS FLOW METER
[75] Inventor: Takeshi Shiota, Houya, Japan
[73] Assignee: St Lab., Inc., Tokyo, Japan
[21] Appl. No.: 220,308
[22] Filed: Dec. 29, 1980
[51] Int. Cl.³ .............................................. G01F 1/78
[52] U.S. Cl. ................................................. 73/861.38
[58] Field of Search ............ 73/861.37, 861.38, 32 A, 73/650

[56] References Cited
U.S. PATENT DOCUMENTS
4,187,721  2/1980  Smith ............................... 73/861.38

Primary Examiner—Charles A. Ruehl
Attorney, Agent, or Firm—Kane, Dalsimer, Kane, Sullivan and Kurucz

[57] ABSTRACT

In a mass flow meter having a "U" shaped conduit through which a fluid to be measured flows and oscillation means therefor to cause the "U" shaped conduit to produce a torsional moment due to the Coriolis force, a torque beam on which strain gages are mounted is fixed between both legs of the "U" shaped conduit to detect the torsional moment as an electric quantity.

5 Claims, 5 Drawing Figures 4,381,680

MASS FLOW METER

FIELD OF THE INVENTION

The present invention relates to a mass flow meter and more particularly a mass flow measuring device in the form of a "U" shaped conduit through which a fluid material flows and which is subjected to oscillation for producing a Coriolis force proportional to the mass flow and arranged to measure a torsional moment caused in the "U" shaped conduit due to the Coriolis force.

BACKGROUND OF THE INVENTION

In this kind of device, the application of strain gages is conceived as a simple means for the detection of torsional moments in a "U" shaped conduit. One known device as taught by U.S. Pat. No. 4,187,721 is shown in FIG. 1.

In the figure, strain gages 1 and 2 are mounted adjacent to the intersection of inlet leg 3 and base leg 4 and outlet leg 5 and base leg 4 respectively. Strain gages 1 and 2, which may be viewed as variable resistors dependent upon the distortion of the adjacent portion of the "U" shaped conduit are connected with resistors 6 and 7 to form a bridge circuit communicating with a voltage source as indicated, and connected to AC differential amplifier 8. In the case of simple oscillation of the "U" shaped conduit, the resistivity of strain gages 1 and 2 varies equally thereby providing essentially identical inputs to AC differential amplifier 8. However, in the event of distortion due to Coriolis forces, one of strain gages 1 and 2 will increase in resistivity while the other decreases thereby providing different inputs to AC differential amplifier 8 and providing an output in the form of an AC signal proportional in magnitude and sense to the different strains imposed upon strain gages 1 and 2.

The output from AC differential amplifier 8 is directed to synchronous demodulator 9, which, in conjunction with the conduit oscillation signal, provides a DC output proportional in magnitude and sense to the distortion of the "U" shaped conduit as a result of Coriolis forces.

However, it may well be said that no practicability is found in such an embodiment. The reasons are that the output from such a device is extremely small because of the much too small Coriolis force and that the effects of flow vibration and temperature are great because of the strain gage installations directly on the conduit.

Furthermore, even under simple oscillation, the outputs from both strain gages 1 and 2 do not get small enough as a result a cancellation in the AC differential amplifier due to the phase difference between both strain gages 1 and 2.

SUMMARY OF THE INVENTION

Accordingly, the object of the present invention is to detect any torsion in a "U" shaped conduit with higher sensitivity in a wider range by utilizing strain gages in a mass flow meter of the type discussed above. The purpose of the present invention can be fulfilled by arranging a torsion-suffering beam, so called a "TORQUE" beam of negligible rigidity compared with that of the "U" shaped conduit, in the form of a bridge between the parallel legs of the "U" conduit and mounting strain gages on the torque beam.

This and other objects, features and advantages of the present invention, as well as the invention itself, will become more apparent from the following description of the preferred embodiments of the present invention taken in conjunction with the accompanying drawings.

DESCRIPTION OF THE PREFERRED EMBODIMENTS

Figure 1:
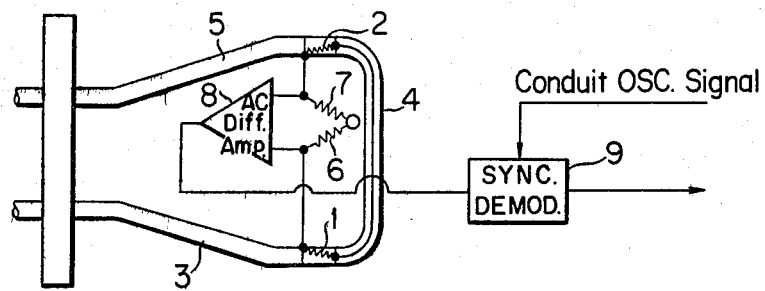
FIG. 1 is a schematic view of a mass flow meter of prior art in the form of a "U" shaped conduit, in which strain gages are used as means for detecting torsional moment of the "U" shaped conduit.
Figure 2:
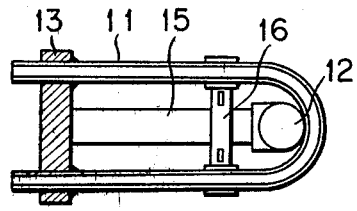
FIG. 2 is a front view of one embodiment of the present invention.
Figure 3:
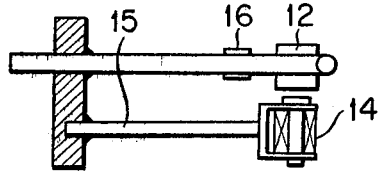
FIG. 3 is a side view of the embodiment.

FIG. 2 is a view of a "U" shaped conduit 11 through which a fluid to be measured flows, and a permanent magnet 12 is fixed to the top end thereof. Both ends of the "U" shaped tube 11 are fixed to a base 13. A support beam 15 with an electromagnet 14 fixed at the top end thereof is arranged facing the "U" shaped tube 11 and is fixed to the base at the bottom end thereof to form a tuning fork structure.

A "TORQUE" beam 16 is fixed between both legs of the "U" shaped conduit 11 adjacent permanent magnet 12 and strain gages 17, 18, 19 and 20 are installed on both surfaces of the beam 16. These strain gages 17, 18, 19 and 20 are positioned respectively in an equal distance from the legs as shown in FIG. 4.

The following explanation is given of the operation of flow meter constructed as above. A Coriolis force is generated in the flow passing through the "U" shaped tube 11 by oscillating the tuning fork structure at the natural frequency with an electromagnetic force created between the electromagnet 14 and the permanent magnet 12 of the opposite "U" shaped conduit 11. The magnitude of the Coriolis force is proportional to the mass of a fluid flowing through the "U" shaped conduit 11 and the direction of the force agrees with the direction of vector product of the movement direction of the flow and angular velocity to oscillate the "U" shaped conduit. Thus, a torsional moment or torque is generated in the "U" shaped conduit 11 by the Coriolis force on the sides of both legs since the flow direction is reversed on the input and output sides of the "U" shaped conduit 11.

The torque is given as vibrating torque of the same frequency as the oscillating frequency and the amplitude thereof is proportional to the mass flow. The vibrating torque is transmitted to the torque beam 16 and converted into an electric quantity by distorsion of four strain gages mounted on the surfaces of the beam. The four strain gages constitute a bridge circuit supplied with DC voltage at Ein terminal as shown in FIG. 5 to convert only the vibrating torque into an electric equivalent output proportional to torque T, as shown in FIG. 4. Namely, in FIG. 4 if torque T is generated in the counter clockwise direction, the strain gages 17 and 20 are compressed while the other gages 18 and 19 are elongated, providing a vibrating unbalance voltage output from Eout terminal in FIG. 5. On the other hand, the forces of vibration in the Y—Y directions due to the electromagnet drive can scarcely cause the strain gages 17-20 to distort and even if a bit of distortion may occur therein, they are compensated for and cancelled with each other in the bridge circuit in FIG. 5. As for the circuit connection for constituting the bridge, the strain gage 18 can be replaced with the strain gage 19 and the strain gage 17 with the strain gage 20 in FIG. 5 in a manner so that the strain gages distorted in the different sense (compression or elongation) due to the torsional moment are connected in series with one another.

Figure 4:
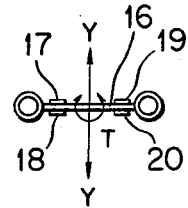
FIG. 4 is a view of the embodiment to illustrate the operation.
Figure 5:
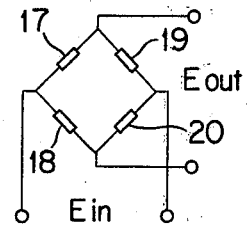
FIG. 5 is an electric connection diagram of the embodiment.

It is apparent that similar effects can be obtained by the two-gage method using two strain gages, where for instance, strain gages are employed for 17 and 18 in FIG. 4 while the other gages 19 and 20 in FIG. 5 are replaced by fixed resistors. Also, another arrangement is considered in which strain gages 18 and 20 are replaced by fixed resistors. As for the circuit connection, in the former example the strain gage 18 which is mounted on the opposite surface of the torque beam 16 to the strain gages 17 and the same distance from one leg of the "U" shaped conduit can be exchanged with the replaced fixed resistors 19 in FIG. 5 and in the later example the strain gage 19 which is mounted on the same surface with the strain gage 17 and the same distance from the respective legs of the "U" shaped conduit can be exchanged with the replaced fixed resistor 18.

Namely, the distortion of the strain gages in the same sense due to temperature deviation or oscillation component which occurs, as the case may be, is compensated for by connecting two strain gages which are distorted in the different senses from each other responding to the torsional moment in series in the bridge circuit. However, the two-gage method is inferior to the four-gage method in sensitivity.

The one or three gage method can be also employed, but such nonsymmetric arrangements have difficulty in balancing the noise components having the same sense such as mentioned above. Furthermore, a series circuit of two strain gages or one resistor and one strain gage can be used in accordance with the present invention, but such a series circuit cannot compensate for the input-voltage component.

In the bridge circuit, AC voltage may be supplied to Ein terminal in FIG. 5 on condition that a synchronous demodulator is used as a detector of the vibrating signal. For the oscillation of the "U" shaped conduit, the permanent magnet is not always necessary. When the "U" shaped conduit is formed from a magnetic substance it can be eliminated, and direct coupling of the electromagnet with the "U" shaped conduit is also possible.

As is clear from the above, by mounting the strain gages on the torque beam bridged between legs of the "U" shaped conduit, the torsional moment thereof can be detected as an electric signal with high sensitivity. Furthermore, temperature and small signal characteristics are greatly improved, since the strain gages are not directly influenced by temperature and vibration of the fluid. Thus, the mass flow meter in accordance with the present invention allows for excellent measurement of a single flow or pulse flows of gas, liquid, slurries or the like with a linear relation between the mass flow and output under a wide rangeability, high sensitivity and excellent S/N ratio. Especially, when the bridge circuit is formed by the strain gages, noise components due to temperature deviation in fluid and atmosphere, oscillation of the "U" shaped conduit and input voltage are compensated and a high reliability of the measurement is attained.

What is claimed is:

1. A mass flow meter comprising:
   a base;
   a "U" shaped conduit having two legs with each leg terminating in an end and through which a fluid to be measured flows, both ends of said "U" shaped conduit being fixed to said base;
   a supporting beam, one end thereof being provided with an electromagnet and the other end thereof being fixed to said base, the beam and the conduit being positioned on the base and with respect to one another so that they form a tuning fork structure with the "U" shaped conduit being oscillated at a natural frequency of said tuning fork structure; and
   a torque beam fixed between the two legs of said "U" shaped conduit, at least one strain gauge mounted on the torque beam, said at least one strain gauge being electrically responsive to the torque transmitted to said torque beam from said "U" shaped conduit to measure the amount of torque moment.

2. A mass flow meter according to claim 1 wherein the torque beam has a pair of opposing surfaces, four strain gauges being mounted on both opposing surfaces of said torque beam and being respectively equidistant from an adjacent leg, said four strain gauges constituting a bridge circuit arranged so that strain gauges differently distorted due to said torque transmitted to said torque beam are connected in series with one another.

3. A mass flow meter according to claim 1 wherein a pair of opposing strain gauges are each mounted on one of the pair of opposing surfaces of said torque beam and said two strain gauges being equidistant from at least one of said legs, and said two strain gauges being connected in series with two resistors to form a bridge circuit.

4. A mass flow meter according to claim 1 wherein two strain gauges are mounted on one of the opposing surfaces of said torque beam and are equidistant from both legs, the two strain gauges being connected in series with two resistors to form a bridge circuit.

5. A mass flow meter according to claims 1, 2 or 3 wherein said bridge circuit is supplied with DC input voltage.

* * * * *

UNITED STATES PATENT AND TRADEMARK OFFICE
CERTIFICATE OF CORRECTION

PATENT NO. : 4,381,680
DATED : May 3, 1983
INVENTOR(S) : Takeshi Shiota

It is certified that error appears in the above-identified patent and that said Letters Patent are hereby corrected as shown below:

Column 2, line 36: insert --the-- after "of".

Signed and Sealed this

Twelfth Day of July 1983

[SEAL]

Attest:

GERALD J. MOSSINGHOFF

*Attesting Officer*     *Commissioner of Patents and Trademarks*